United States Patent [19]

Azum et al.

[11] 3,746,844

[45] July 17, 1973

[54] APPARATUS FOR DETERMINING THE CENTER OF GRAVITY OF PASSENGERS IN A VEHICLE, NAMELY AN AIRCRAFT

[75] Inventors: Jacques Azum, Roger Claustre, both of Toulouse, France

[73] Assignee: Societe Nationale Industrielle Aerospatiale, Paris, France

[22] Filed: Oct. 13, 1971

[21] Appl. No.: 188,734

[30] Foreign Application Priority Data
Oct. 22, 1970 France .................................. 7038138

[52] U.S. Cl. ................ 235/150.2, 73/65, 340/27 R, 340/178, 340/278
[51] Int. Cl. .......................... G06g 7/70, G01m 1/12
[58] Field of Search ...................... 235/150.2; 73/65; 340/27 R, 178, 278

[56] References Cited
UNITED STATES PATENTS

| | | | |
|---|---|---|---|
| 2,520,428 | 8/1950 | Nilakantan | 235/150.2 |
| 2,541,429 | 2/1951 | Mathes et al. | 235/150.2 |
| 2,559,718 | 7/1951 | Goodlett et al. | 73/65 |

FOREIGN PATENTS OR APPLICATIONS
1,913,930  1/1970  Germany ........................ 235/150.2

Primary Examiner—Felix D. Gruber
Attorney—Karl W. Flocks

[57] ABSTRACT

The invention is concerned with an apparatus for determining the center of gravity of a group of objects which are distributed randomly in the squares of a two dimensional grid system having an arbitrarily chosen origin. Each object is detected and two electrical signals are generated for each detected object a first signal having a constant strength and length and a second signal having a constant strength and length proportional to the distance from the origin of the object. The sum of the first signals is representative of the total weight of the objects and the sum of the second signals is representative of the sum of the moments of the objects about the origin. The quotient of the two sums is measured and represents the center of gravity of the objects relative to the origin.

6 Claims, 6 Drawing Figures

APPARATUS FOR DETERMINING THE CENTER OF GRAVITY OF PASSENGERS IN A VEHICLE, NAMELY AN AIRCRAFT

This invention relates to a process and an apparatus for determining the total weight and the position of the center of gravity of very similar objects with a random distribution in a rectangular grid system. The invention is of use mainly for determining the position of the center of gravity of the passengers in any vehicle adapted to move without being connected to the ground, to determine vehicle trim when passengers in the vehicle sit down and change one's seat therein arbitrarily.

The invention therefore relates mainly to aircraft, air-cushion vehicles, space vehicles and ships.

The invention can provide, at a rate which can be very rapid if the movements are frequent, signals serving to control the movement of mobile masses so as to compensate for an unsatisfactory distribution of passenger weight.

This problem mainly occurs of course in connection with high-speed aircraft, and hereinafter the review of the prior art and the description of the invention will refer more particularly to this case. Also, for the sake of simplicity and because the invention relates mainly to such aircraft, the particular description hereof will deal only with the case of a grid system in which one dimension is small relative to the other — i.e., center-of-gravity determination is performed only along the length of the grid system; in the case of such an aircraft the length of the grid system corresponds to the fuselage axis. Clearly, however, and as will become apparent, the facilities provided by the invention can be applied similarly in both directions of a rectangular grid system which is extensive in both directions, so that the center of gravity can be determined by two rectangular coordinates corresponding to the directions of the system.

With regard to determining the center of gravity of a vehicle, processes and facilities are known for measuring the overall weight and the position of the center of gravity of vehicles. Such facilities use stress gauges which form part of the vehicle structure or which are placed in the undercarriage suspension gear; some special facilities can measure the position of the center of gravity and the weight of fuel reserves by means of potentiometric level gauges. Other facilities, of use in aircraft, are known which determine the position of the center of gravity in flight by measuring the trim correction drag.

Knowing the position of the center of gravity and the total weight of the load of a vehicle is very useful and even essential for vehicles such as high-speed aircraft and air-cushion vehicles. Their stability, speed and performance depend upon these parameters, and once they are known the distribution of readily movable loads such as fuel can be altered so that the general center of gravity of an aircraft can be made to coincide with its optimum position in relation to the lift application point.

In a passenger aircraft the factors which may modify the position of the center of gravity are the freight, the passengers and the fuel distribution between the various tanks. The freight weight is known and its center of gravity can be kept constant if the load is distributed appropriately in the holds. Passenger distribution, on the other hand, is a random factor, and the only known way at present of determining the center of gravity of the passengers on the basis of their distribution in an aircraft is a calculator.

The idea behind the invention is to provide data on the center of gravity of the passenger weights in a form such that the data can be supplied to a computer controlling the transfer of mobile compensating loads, and, more particularly in an aircraft, the liquid fuel.

In the process according to the invention for determining the position of the center of gravity of very similar objects, i.e., the passengers with a random distribution in the squares of a grid system in one of the two directions thereof relatively to one edge of the grid system forming origin, it comprises forming as many groups as there are rows of aligned squares in the other direction of the grid system, detecting the presence of each object in one of the squares of the system, transmitting consecutively for each object whose presence is detected a first electrical signal of constant strength and duration and a second signal of the same strength but of a duration proportional to the distance from the origin of the group to which such object belongs, integrating the first and second signals and displaying the quotient of the sum of the second signals by the sum of the first signals.

Consequently, since the objects are at least statistically of equal weight (72 kg for human passengers in an aircraft), the process according to the invention provides two items of information, one of which is proportional to the total weight of the objects by totalizing equal pulses, and the other of which is proportional to the sum of the moments of the weight of such objects relatively to the perpendicular through the origin edge in which it is required to determine the center of gravity, the quotient of the second by the first of the numbers representing this information giving of course the abscissa (or the ordinate, depending on the direction chosen) of the center of gravity relatively to the origin.

The elements for detecting the presence of an object in each of the squares of the grid system can be of any kind, such as small transmitters triggered by the presence or proximity of an object. In their simplest form, the detectors are, with advantage, embodied as an electric contact operated by the presence of the body in the associated square of the grid system, inter alia by the presence of a passenger in one of the aircraft seats. A contact of this kind can take the form of a switch associated with the seat cushion or a switch operated by means associated with the seat, such as the safety belt, in which case if other means provide information on the total number of passengers, a check can be made on proper use of the safety belts.

Advantageously, so that pulses are transmitted automatically for each seat occupied, recurrent pulses of a relatively high frequency are transmitted by a clock associated with a series of flip-flops forming binary dividers of such pulses; and through the agency of coincidence circuits, one of the equal sharing intervals of a complete pulses cycle is associated with each group of squares (seats), a predetermined number of clock pulses being transmitted in such interval, such pulses entering a dividing facility whose division factor is a number corresponding to the order number of the group from the origin, the divider being connected to a shift register passing whichever of the pulses correspond to an occupied square, the resulting pulse train going to a pulse integrator and to a pulse detecting and reshaping facility which converts the weighted pulses from the divider of each group into equal pulses, such detector also being connected to an integrator.

Of course, the number of clock pulses contained in a complete cycle of the apparatus, the cycle being determined by the number of cascaded bistables forming the consecutive dividers of the number of clock pulses transmitted, depends upon the size of the rectangular grid system.

A first requirement is that in each slot of the cycle allotted to any group the number of clock pulses should be greater than the product of the maximum order number of the furthest group by the number of squares it contains; a second requirement is that the number of slots should be at least equal to the total number of groups plus a safety factor of one unit to cover the transmission time of a signal for zero resetting all the counting elements of the apparatus so as to obviate any mistake in the next measurement cycle and to cut out any effect of parasitic pulses transmitted during measurement over the circuits thereof.

To give some idea of the invention, a description will hereinafter be given of the case of an aircraft having in its fuselage 30 rows of four seats. In this case, therefore, the number of clock pulses in a slot must be greater than $30 \times 4 = 120$. A number of $2^7 = 128$ pulses per slot has therefore been chosen, and the number $2^{12} = 4,096$ has been chosen for the total cycle, the latter number being greater than the product of $31 \times 128 = 3,968$.

This particular embodiment of the invention will now be described by way of example only with reference to the accompanying drawings wherein.

Figure 1:
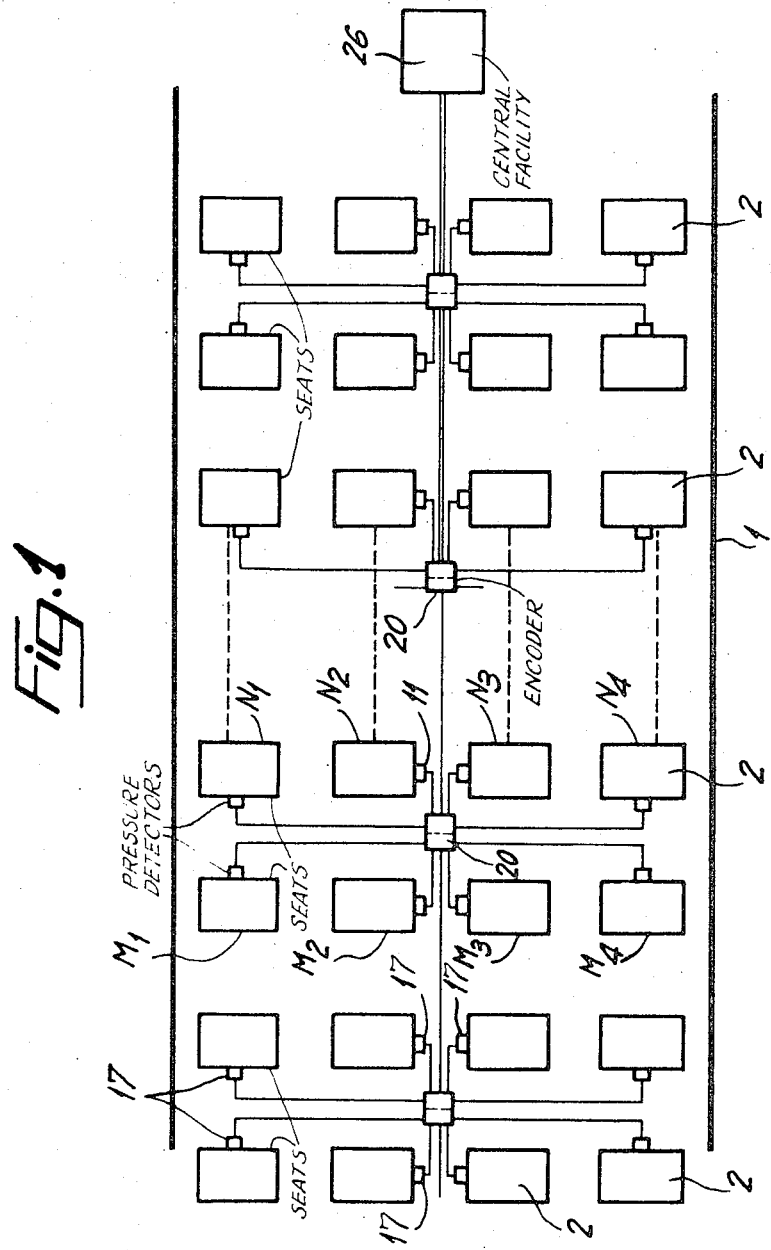
FIG. 1 is a diagrammatic plan view of the seat positions in an aircraft fuselage, plus some of the associated calculating elements.
Figure 3:
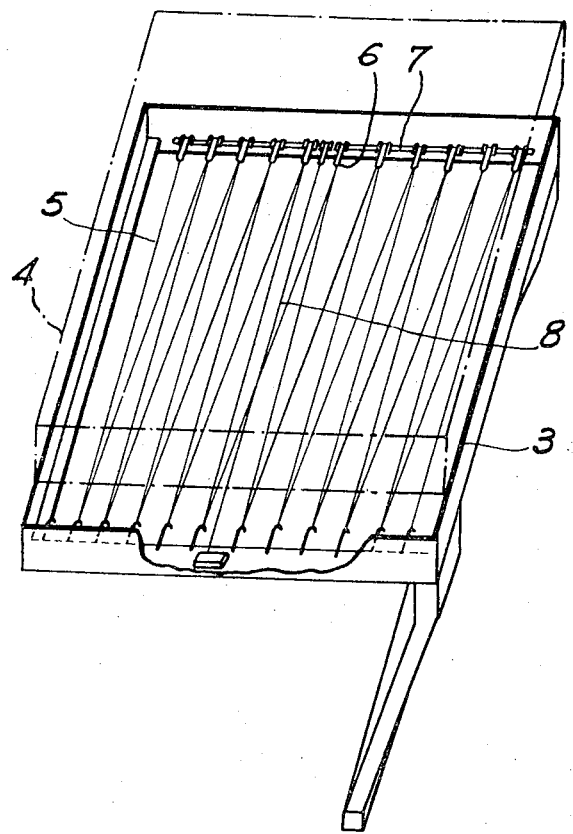
FIG. 3 is a diagrammatic perspective view showing the installation of a passenger presence detector.
Figure 4:
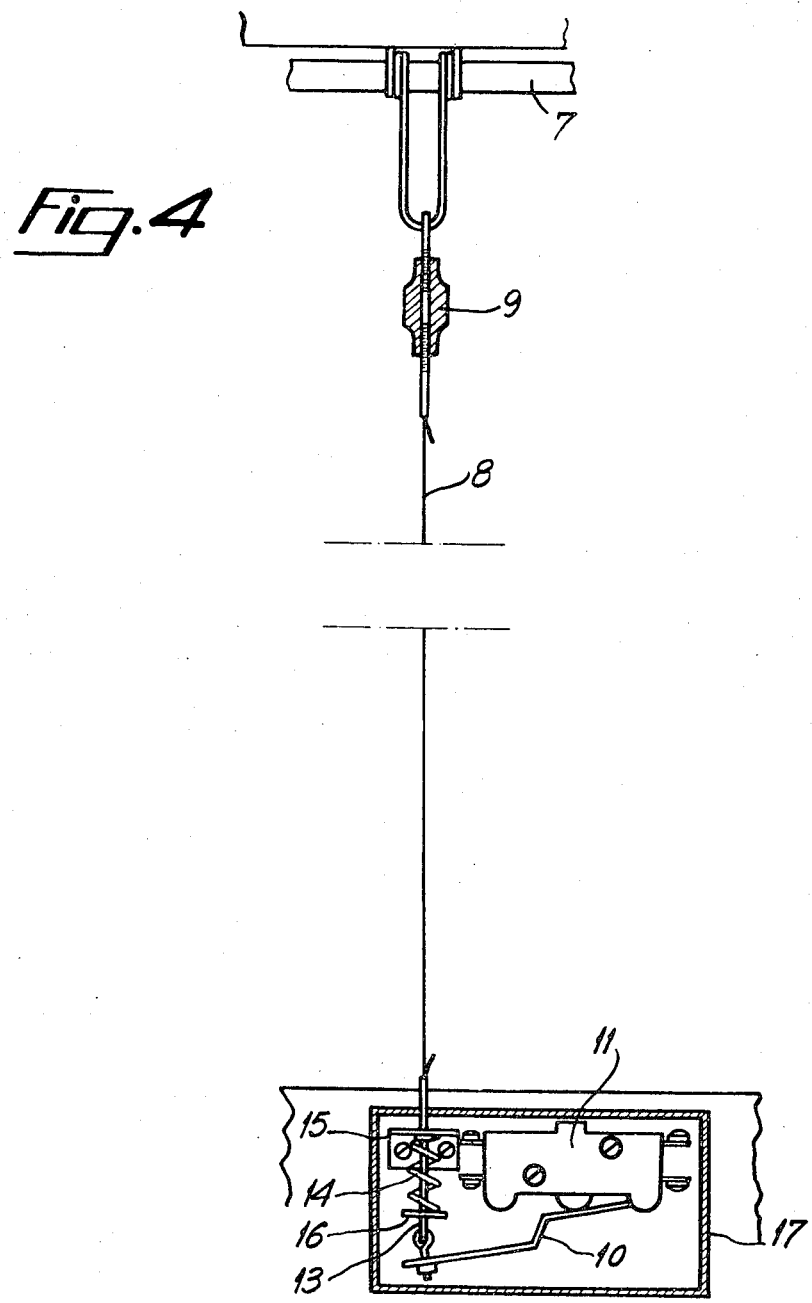
FIG. 4 shows details of the detector construction.

In the embodiment shown in FIG. 1, cabin 1 of a vehicle, — in the event, the fuselage of a high-speed aircraft — contains 30 rows of four seats 2 each having a presence detector 17 such as shown, e.g., in FIGS. 3 and 4.

Referring to FIGS. 3 and 4, a frame 3 for a seat cushion 4 has zig-zag wiring 5 whose bends are secured to springs 6 secured to rods 7 rigidly secured to frame 3. A cable 8 (see also FIG. 4) is stretched in the central part of the seat; one end of cable 8 is attached to rod 7 by way of a turnbuckle 9 for adjusting the tension, while the other end of cable 8 is connected to a lever 10 which operates a microcontact 11. Cable 8 is connected to lever 10 by way of a rigid rod 13 having around it a return spring 14 which bears at one end on collar 16 of rod 13 and at the other end on a right-angled member 15; the whole is contained in a box 17.

Occupation of the seat operates the microcontact 11. However, the force of the return spring 14 and the tension of the cable 8 are such that the microcontact is operated only by the presence of a passenger and not by the presence of an article placed on the seat.

The microcontact can also be placed in one of the two half-shells of the safety belt buckle or alternatively such buckle can comprise a connector interconnecting two conductors fitted in each of the two parts of the safety belt.

As will become apparent hereinafter, these features make it possible to check whether all the passengers of an aircraft are using their safety belts properly at the required times, provided of course that the number of passengers is known and is the same as the number given by the computer.

Figure 2:
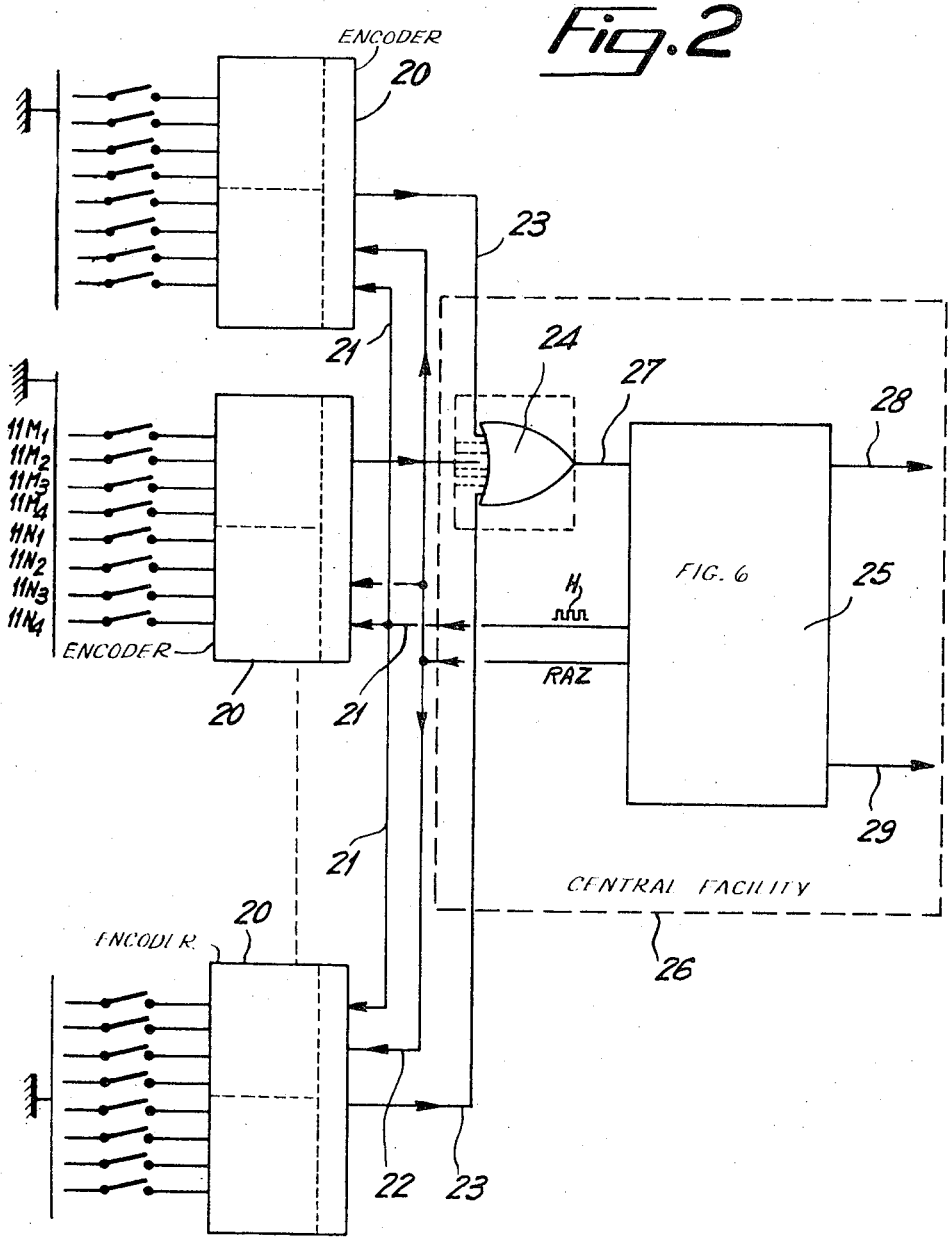
FIG. 2 is a schematic diagram of the complete circuit arrangement.
Figure 5:
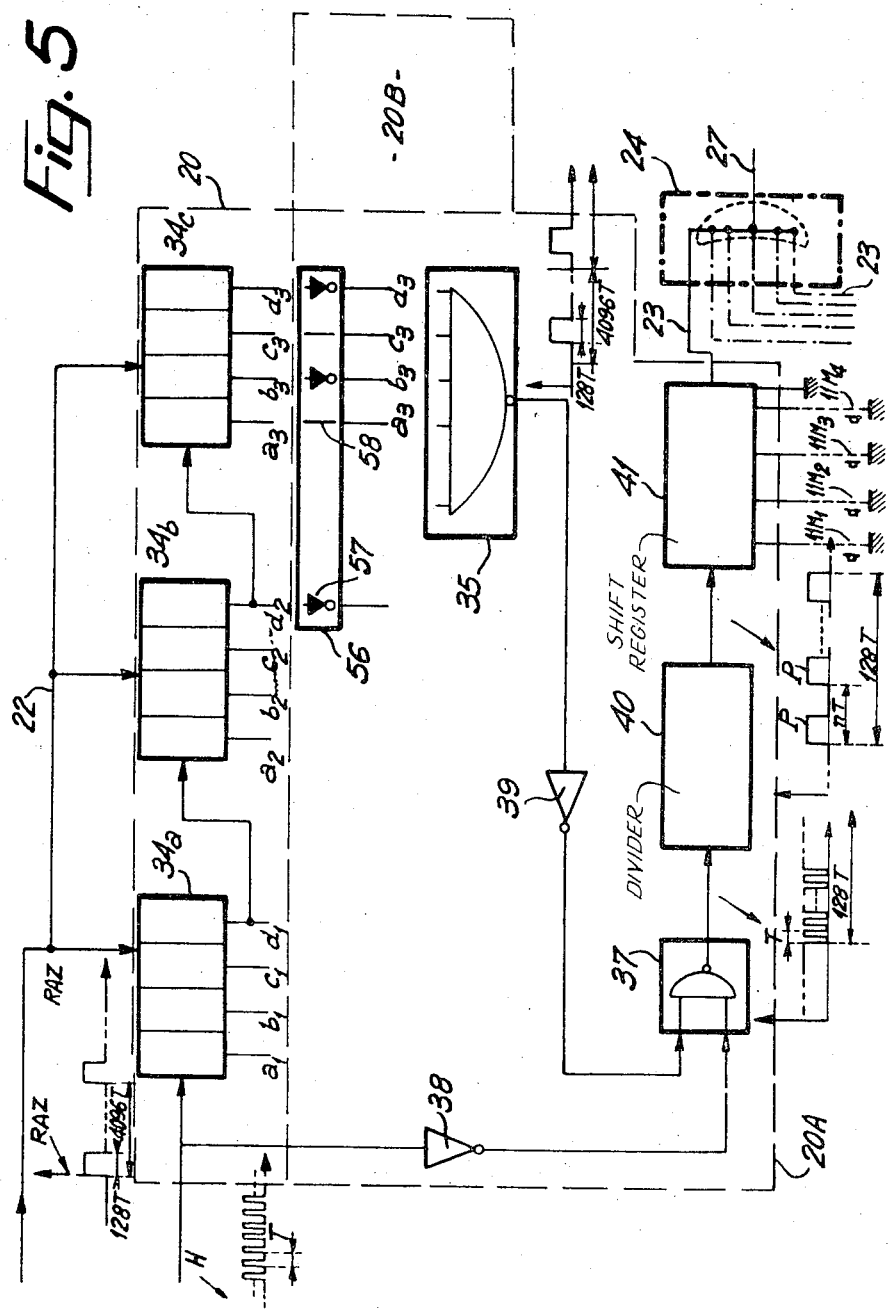
FIG. 5 is a schematic diagram of that part of the circuit arrangement which is associated with a group.

As FIG. 1 shows, an encoder 20 is associated with each pair of rows of four seats, e.g., $M_1$ to $M_4$ and $N_1$ to $N_4$; as can be seen in FIG. 2, the encoder 20 has in all eight independent earthing connections, each actuated by a seat micro-contact 11, i.e., $11M_1$ to $11M_4$ and $11N_1$ to $11N_4$ shown in FIG. 1. The rows being evenly spaced, the number of each row represents the distance of the row from one end of the aligned rows. As will be described hereinafter, each encoder 20 is divided into two half-encoders 20A, 20B each allotted to one 4-seat row, the encoder 20 also having a number of items which are common to the two half-encoders 20A, 20B (FIG. 5).

All the encoders 20 are connected in parallel and each encoder has three connections — a clock pulse feed connection 21, a sync or zero resetting connection 22 and a connection 23 for the transmission of data to the central facility 26. All the parallel conductors 21-23 form a cable which may be embedded in the cabin structure and which extends to the facility 26.

Figure 6:
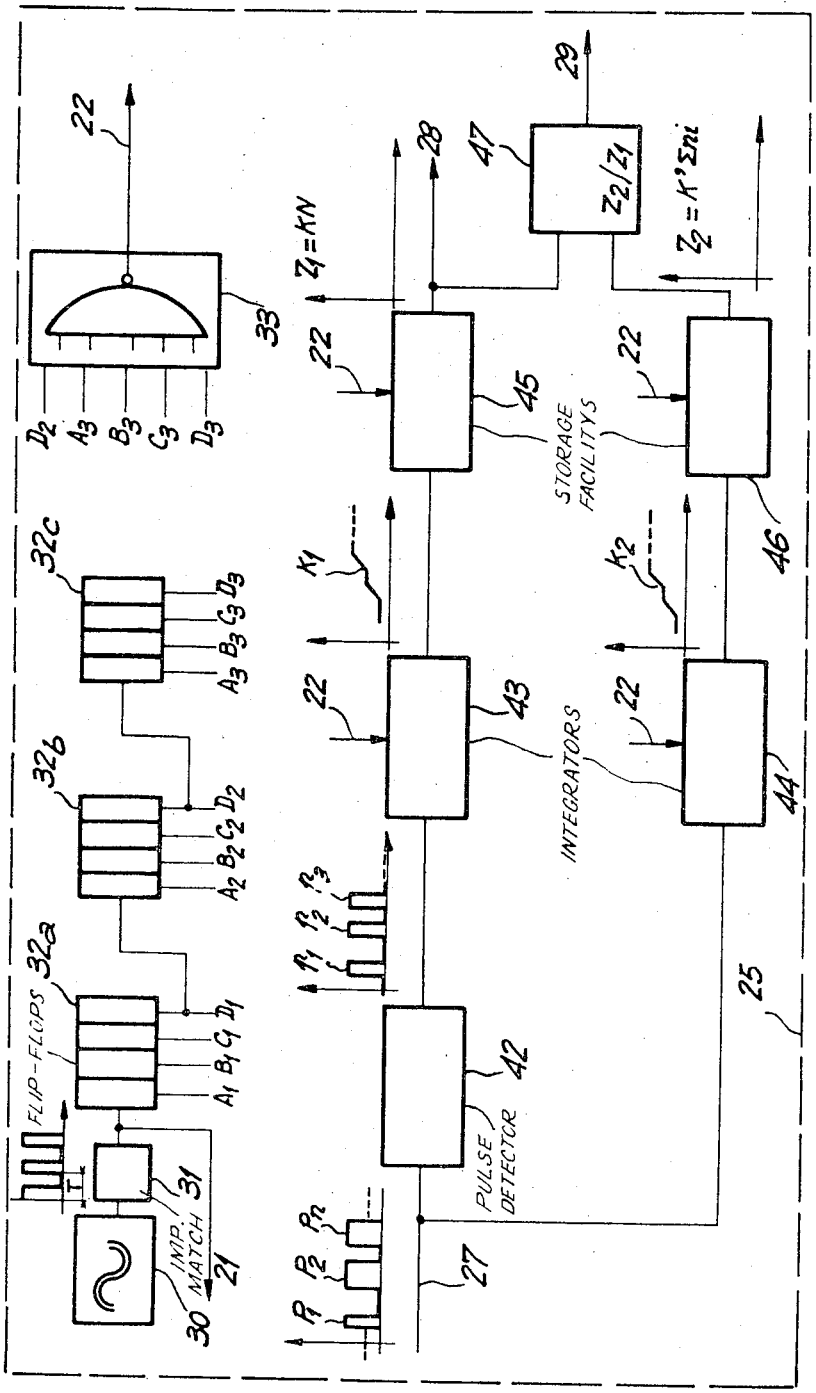
FIG. 6 is the circuit diagram for the central transmit/receive facility of the computer.

The output conductors 23 of all the encoders are connected to part 25 of central facility 26 by way of an OR-gate 24 which can be carried at the end of said cable. The part 25, which, therefore, receives via a single conductor 27 all the encoder output data, also comprises, as will be shown hereinafter (FIG. 6), the pulse-transmitting clock and the zero resetting signal transmitter.

A signal representing the number of passengers can be derived from output 28 of facility 26, and output 29 (see also FIG. 6) can provide a signal representing the position of the center of gravity in the form of a signal representing the distance of the center of gravity from the grid system origin, which is near the first row of seats.

The facility 25 (FIG. 6) comprises an oscillator or clock 30 outputting rectangular signals H at a frequency of, e.g., 4,000 Hz. These clock signals go via an impedance matcher 31 via conductors 21 to each of the encoders 20 and also to the cascade of three groups of four flip-flops 32a, 32b, 32c of the central facility, each such bistable having an output $A_1$, $B_1$, $C_1$, $D_1$, $A_2$, $B_2$, $C_2$, $D_2$, $A_3$, $B_3$, $C_3$, $D_3$ from which rectangular signals can be derived with a frequency divided by $2^n$ derivatives of the fundamental frequency of the signal H, $n$ having all the values between 1 and 12. For instance, the period of the rectangular signal at the last output $D_3$ is 4,096 T, T denoting the period of the clock signal H. Consequently, since the total duration of a cycle as determined by the final bistable or divider is 4,096 clock periods, the cycle lasts about 1 second if the clock frequency is 4,000 Hz.

The outputs of the last five bistables $D_2$, $A_3$, $B_3$, $C_3$, $D_3$ of the divider cascade are directly connected one each to the five inputs of a coincidence circuit 33, shown as a NAND gate, whose output delivers zero resetting signals RAZ to all the conductors 22 connected respectively to the encoders and to the various circuits 42 to 46 including counters of the facility 25.

As will be apparent, in the example shown the coincidence circuit 33 delivers at the start or end of each cycle period of 4,096 clock periods a signal whose duration is half the period of the signal sampled at output $D_2$ — i.e., 128 periods — since this is the only time at which all the rectangular waves whose period is double each other are simultaneously at zero or 1.

Each of the encoders 20 also comprises a similar set of 12 flip-flops in three groups of four: 34a, 34b, 34c (FIG. 5). These flip-flops also comprise outputs $a_1, b_1, c_1, d_1, a_2, b_2, c_2, d_2, a_3, b_3, c_3, d_3$ corresponding to the outputs of the flip-flops delivering the signal RAZ through the NAND gate 33. Similarly, the five final outputs $d_2, a_3, b_3, c_3, d_3$ are connected in each half-encoder to a coincidence circuit 35, also in the form of a NAND gate, by way of a connecting bar 56. Bar 56 is individual for each of the half-encoders (except for this detail the half-encoder 20B is similar to the half-encoder 20A) and has a number of inverters 57 combined with direct connections 58 (or for one of them inverters only).

There are therefore 31 different connecting bars or 31 possible connections of this kind between the outputs $(d_2, a_3, \ldots d_3)$ and one gate 35 (the 32nd — all direct connections — being used in the circuit arrangement of the gate 33 with the divider cascade 32a, 32b, 32c and the clock 30 which is common to all the divider cascades of the apparatus), so that in the cycle of 4,096 clock periods a slot of 128 periods T can be devised for each of the 30 half-encoders, the slot being unique and independent of the other slots, the half-encoder being able to receive 128 clock signals during the slot. Accordingly, the output signal $S_1$ of gate 35 is supplied, together with the clock signals transmitted via lines 21, to the input of a coincidence circuit 37, which like the others can be a NAND gate, the input line thereto comprising in that case inverters 38, 39. The output of gate 37 is connected to the known frequency divider 40 with a dividing factor n, n denoting the order number of the row of seats to which the half-encoder corresponds. Such a divider comprises interconnected flip-flops, the last one of which changes over every n pulses. Dividers of this kind are, for example, sold by "National semiconductor" under the name Modulo "N" type DM 7520. Consequently, divider 40 outputs a sequence of rectangular waves of period nT, the total duration of such sequence being 128 T. The rectangular waves go to shift register 41 which has the same number of stages as the number of seats in a row — in this case, four. The shift register may comprise a parallel-series divider as sold by TEXAS INSTRUMENTS with the reference SN 5494.

Such a parallel-series divider comprises, in the present case, four parallel inputs corresponding to the detector switches $11M_1, 11M_2, 11M_3, 11M_4$, and inner counters of the pulses coming from divider 40, in such manner that, for example, the third pulse P is registered in the third stage of shift register only if switch $11M_3$ is closed. As soon as the counter corresponding to $11M_4$ has counted the number four, the register shifted. Consequently, at shift register output 23 there are a number of pulses P whose duration is proportional to the distance of the corresponding seat row from the origin and which is somewhere between 0 and 4, according to the state of seat occupancy.

In the example chosen, since the number n can be 30, the four periods nT can occupy in time 120 of the 128 clock periods available for the last row.

The various lines 23 therefore each transmit in turn a number of pulses between 0 and 4 whose duration is proportional to the distance of the corresponding row from the origin. These signals therefore form a sequential train on output line 27 of OR-gate 24.

The total message containing the pulses $P_1, P_2, \ldots P_n$ therefore goes via conductor 27 to pulse detector 42, for example, a monostable which converts the pulses $(P_1 \ldots P_n)$ into pulses $(P_1 \ldots P_n)$ of uniform duration. The output of detector 42 is connected to a capacitative integrator 43 and the conductor 27 is connected to a capacitative integrator 44. Integrators 43 and 44 may be operational amplifier shunted by a capacitor.

The integrator 43, which receives equal pulses, acquires a charge $K_1$ which is proportional to the number of pulses received — i.e., to the number of passengers. This number can be stored in either analogue or numerical form in facility 45. Facility 45 may comprise a capacitor if the signal is stored in analogue form or may be an analogue-digital converter. Whence, the number of pulses can be sampled via output 28 to check the number of passengers or, in cases in which the contact 11 is associated with the safety belts, to check that the same are being used properly.

The integrator 44 acquires a charge $K_2$ which is proportional to the sum of the moments of the weight of each of the passengers relatively to the counting origin of the rows. The total information is stored in facility 46 which comprises also a capacitor.

Facility 45 therefore contains the information $Z_1 = kN$, N denoting the number of passengers, and facility 46 contains the information $$Z_2 = k' \sum_0^N ni,$$

$ni$ denoting the pulse representing the moment of each occupied seat of distance n. Facilities 45 and 46 comprise linear amplifiers for mutual adjustment of the values $Z_1 Z_2$.

The analogue divider 47, for example, of the types MC 1594 and MC 1595 manufactured by "MOTOROLA" provides the quotient $Z_2/Z_1$ — i.e., a value proportional to the distance between the center of gravity and the origin.

In the case of aircraft and other vehicles using liquid fuels, the signal from output 29 of analogue divider 47 can be used directly, e.g., by comparison with a reference signal, to initiate a fuel transfer to compensate for the difference between the position of the center of gravity of all the passengers and its optimum position.

The information can also be used to ask passengers to use seats such as will help to improve the position of the center of gravity.

As already stated, the invention is of use for aircraft, more particularly high-speed aircraft and any other vehicles, such as air-cushion vehicles, in which load distribution may have a considerable effect on performance and even the operation of the propulsion means.

We claim:

1. An apparatus for determining the instantaneous position of the center of gravity of passengers sitting at random in aligned rows of seats in an elongated vehicle, namely an aircraft, comprising a clock oscillator supplying recurrent pulses;

at least one pulse counter of definite capacity receiving said pulses and comprising a cascade of flip-flops acting as binary dividers;

a number of coincidence circuits corresponding to the number of rows, each connected in a definite arrangement to some of said binary dividers for defining a sharing interval of a cycle of pulses corresponding to the counter capacity with each sharing interval corresponding to one row and comprising a number of pulses at least slightly greater than the number of seats of the row multiplied by the number of said rows;

divider means relating to said number of said rows with one connected to the output of each of said coincidence circuits for producing enlarged pulses having the duration of an elementary pulse multiplied by said latter number;

a number of shift registers each including a number of stages corresponding to the number of seats in a row with one connected to the output of said divider means for registering a possible number of enlarged pulses corresponding to the number of seats in the corresponding row;

a detector of each occupied seat connected to one stage of one of said shift registers for allowing registration in said stage of one enlarged pulse only when the seat is actually occupied;

first integrator means connected to all said shift registers for summing all the enlarged pulses;

a pulse generator also connected to all said shift registers for generating a pulse of even duration for each enlarged pulse;

second integrator means for summing said even duration pulses;

and analogue divider means for dividing the signal output from said first integrator by the signal output from said second integrator.

2. The apparatus of claim 1 further characterized by said detector of an occupied seat being an electric contact operated by the pressure of a passenger in the seat.

3. The apparatus of claim 1 further characterized by a zero resetting signal means including another series of flip-flops connected to another coincidence circuit which delivers at one end of the pulse cycle determined by the final flip-flop of said series of flip-flops a zero resetting signal to the complete apparatus.

4. The apparatus of claim 1 further characterized by a coincidence gating circuit connected between each of said number of coincidence circuits corresponding to the number of rows and said connecting divider means relating to said number of said row, said coincidence gating circuit also connected to receive a signal from said clock oscillator.

5. The apparatus of claim 1 further characterized by an OR gate connected between all of said shift registers and said first and second integrator means.

6. The apparatus of claim 1 further characterized by storage means to store the output signals from both said integrator means connected to said first and second integrator means, a zero resetting signal means electrically connected to add a zero resetting signal to the outputs from said integrator means before input to said analogue divider means.

* * * * *